(12) United States Patent
Fleming

(10) Patent No.: US 9,303,397 B1
(45) Date of Patent: Apr. 5, 2016

(54) BEAVER CONTROL DEVICE FOR USE WITH A CULVERT PIPE

(71) Applicant: Walter Fleming, Fort Erie (CA)

(72) Inventor: Walter Fleming, Fort Erie (CA)

( * ) Notice: Subject to any disclaimer, the term of this patent is extended or adjusted under 35 U.S.C. 154(b) by 0 days.

(21) Appl. No.: 14/555,637

(22) Filed: Nov. 27, 2014

(51) Int. Cl.
*E03F 7/06* (2006.01)

(52) U.S. Cl.
CPC .................. *E03F 7/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,371,143 A | * | 3/1921 | Bradburn | E04D 13/08 210/460 |
| 4,538,375 A | * | 9/1985 | Kelley | A01M 23/08 43/60 |
| 4,998,847 A | * | 3/1991 | Thurber | E01F 5/005 210/164 |
| 5,102,537 A | | 4/1992 | Jones | |
| 5,581,934 A | * | 12/1996 | Arnold, Sr. | E03F 7/06 210/162 |
| 6,447,206 B1 | | 9/2002 | Fleury | |
| 6,682,651 B1 | * | 1/2004 | Toland | B01D 29/15 210/155 |
| 7,441,989 B2 | | 10/2008 | Fleming | |
| 8,974,665 B2 | * | 3/2015 | Vreeland | E03F 5/14 210/162 |

OTHER PUBLICATIONS

Clemson University, The Clemson Beaver Pond Leveler, Mar. 1994, AFF Leaflet 1, All Pages http://www.clemson.edu/psapublishing/PAGES/AFW/AFW1.PDF.*
Mark Partington, Preventing beaver dams from blocking culverts, Dec. 2002, FERIC, vol. 3, No. 54, All Pages http://www.canadaculvert.com/_common/pdfs/Beaverstop-AD-3-54.pdf.*

* cited by examiner

*Primary Examiner* — Benjamin Fiorello
*Assistant Examiner* — Kyle Armstrong
(74) *Attorney, Agent, or Firm* — Adrian D. Battison; Ade & Company Inc.

(57) ABSTRACT

A beaver control device for use with a culvert pipe features a tubular frame having opposing longitudinal ends which are open and a plurality of openings spaced angularly about the frame. The openings provide alternative paths, in addition to the open ends of the frame, for water to pass through the device in an event that one of the open ends become obstructed. The device also features a plurality of transverse bars spanning across transversely opposing portions of an inner surface of the frame. The transverse bars are spaced along a longitudinal length of the frame and elevated relative to a bottommost edge of the frame which rests on the ground. The transverse bars are closer to the bottommost edge than to a topmost edge of the frame which is vertically opposite same. Elevating and spacing the transverse bars as described deters the beaver from passing through the device.

18 Claims, 5 Drawing Sheets

BEAVER CONTROL DEVICE FOR USE WITH A CULVERT PIPE

FIELD OF THE INVENTION

The present invention relates to a beaver control device of the type having a frame which is tubular and has opposing longitudinal ends which are open and transverse bars spanning across transversely opposing portions of an inner surface of the frame, and more particularly the present invention relates to a beaver control device in which the frame has a plurality of openings spaced angularly thereabout and the transverse bars are spaced along a longitudinal length of the frame and elevated relative to a bottommost edge of the frame which rests on the ground, the transverse bars being closer to the bottommost edge than to a topmost edge of the frame which is vertically opposite the bottommost edge.

BACKGROUND

Culvert pipes, which are widely used to allow water to flow beneath roads without having to redirect it or construct a bridge to pass over the water, present an ideal place for beavers to construct a dam and restrict the flow of water. A number of previous patents have sought to deal with this problem, in which they prevent beavers from entering culvert pipes by physically obstructing an entrance at an end of the culvert pipe through the use of screens. In addition to deterring beavers from entering culvert pipes, it is important to deter them from building dams that obstruct the flow of water through the culvert pipe, too. For example, U.S. Pat. Nos. 5,102,537; 6,447,206; and 7,441,989 describe cone-shaped screens that block beavers and similarly-sized animals from entering the culvert pipe. Furthermore, the cone-shaped screens deter beavers from constructing dams as the beavers are unable to properly anchor the dam. In spite of these benefits, screen-based beaver control devices have shortcomings. Firstly, the small debris may still gather at the screen and promote clogging of the entrance of the culvert pipe. Furthermore, these screens inhibit passage of fish and turtles through the culvert pipe.

SUMMARY OF THE INVENTION

According to one aspect of the invention there is provided a beaver control device for use with a culvert pipe comprising:
a frame which is tubular having:
opposing longitudinal ends thereof which are open;
an inner surface;
a bottommost edge which rests on the ground;
a topmost edge which is vertically opposite the bottommost edge;
a plurality of transverse bars which span across transversely opposing portions of the inner surface of the frame;
wherein the frame has a plurality of openings spaced angularly thereabout;
wherein the plurality of transverse bars are spaced along a longitudinal length of the frame;
wherein the plurality of transverse bars are elevated relative to the bottommost edge of the frame, the transverse bars being closer to the bottommost edge than to the topmost edge.

The embodiment as described in more detail hereinafter operates on the principle of deterrence rather than obstruction as the prior art. Both longitudinal spacing of the transverse bars along the longitudinal length of the frame and elevation of the transverse bars relative to the bottommost edge of the frame in proximate distance thereto afford difficulty and discomfort when crossing the transverse bars that discourages the beavers from doing so. The longitudinal spacing forces a beaver to cross the transverse bars by inserting one foot at a time in a gap between each pair of adjacent transverse bars. In addition, the transverse bars are elevated at a height which is generally slightly larger than an average length of a leg of the beaver, so the elevation creates additional difficulty and discomfort. Furthermore, the present invention overcomes the shortcomings of the prior art in that the transverse bars are elevated at a height so as to allow the passage of small debris, fish, and turtles.

Preferably, each one of the transverse bars is elevated relative to the bottommost edge by a clearance distance which is between 1.5" and 8".

Preferably, each one of the transverse bars is elevated relative to the bottommost edge by a clearance distance which is between 2" and 7.5".

Preferably, each one of the transverse bars is elevated relative to the bottommost edge by a clearance distance which is between 2.5" and 7".

Preferably, each pair of adjacent transverse bars has a spacing distance therebetween which is at least three times greater than a width of each one of the transverse bars.

Preferably, the transverse bars are spaced along the longitudinal length so that each pair of adjacent transverse bars has a spacing distance therebetween which is between 1.5" and 7".

Preferably, the transverse bars are spaced along the longitudinal length so that each pair of adjacent transverse bars has a spacing distance therebetween which is between 2" and 6.5".

Preferably, the transversely opposing portions of the inner surface, which the transverse bars span across, are horizontally opposing portions of the inner surface, and each one of the transverse bars are coupled at each longitudinal end thereof to respective horizontally opposing portions of the inner surface.

Preferably, the transverse bars are aligned so as to lie in a common horizontal plane.

Preferably, each one of the openings has an opening area which is less than or equal to 150 square inches.

Preferably, each one of the openings has an opening area which is less than or equal to 140 square inches.

Preferably, each one of the openings has an opening area which is less than or equal to 135 square inches.

Preferably, the frame further includes at least one circular ring and a plurality of longitudinal bars which are coupled to the at least one circular ring and spaced angularly about the frame. Preferably, each one of the openings is defined by respective gaps between respective longitudinal bars within each pair of adjacent longitudinal bars of the frame. It is preferred that each pair of adjacent longitudinal bars has a gap therebetween, a width of the gap being less than or equal to 5". Preferably, each pair of adjacent longitudinal bars has a gap therebetween, a width of the gap being less than or equal to 4.75". Preferably, each pair of adjacent longitudinal bars has a gap therebetween, a width of the gap being less than or equal to 4.5".

Optionally, the beaver control device further includes hangers for supporting a pipe. The hangers may be attached at respective topmost portions of the inner surface of the frame so as to extend downward therefrom.

According to a second aspect of the invention there is provided a beaver control device for use with a culvert pipe comprising:
a frame which is tubular having:
opposing longitudinal ends thereof which are open;

an axis of the frame spanning between said opposing longitudinal ends;

a circular cross-section along a longitudinal length of the frame;

at least one circular ring which defines the circular cross-section of the frame;

a plurality of longitudinal bars which span between the opposing longitudinal ends of the frame are spaced angularly thereabout, the plurality of longitudinal bars being coupled to the at least one circular ring;

a plurality of transverse bars which span between transversely opposing longitudinal bars which are at respective lateral portions of the frame;

wherein the plurality of transverse bars are spaced along the longitudinal length of the frame;

wherein when the axis of the frame is generally horizontal, the plurality of transverse bars are spaced above at least a portion of a subset of the longitudinal bars which is below a highest respective one of said transversely opposing longitudinal bars.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
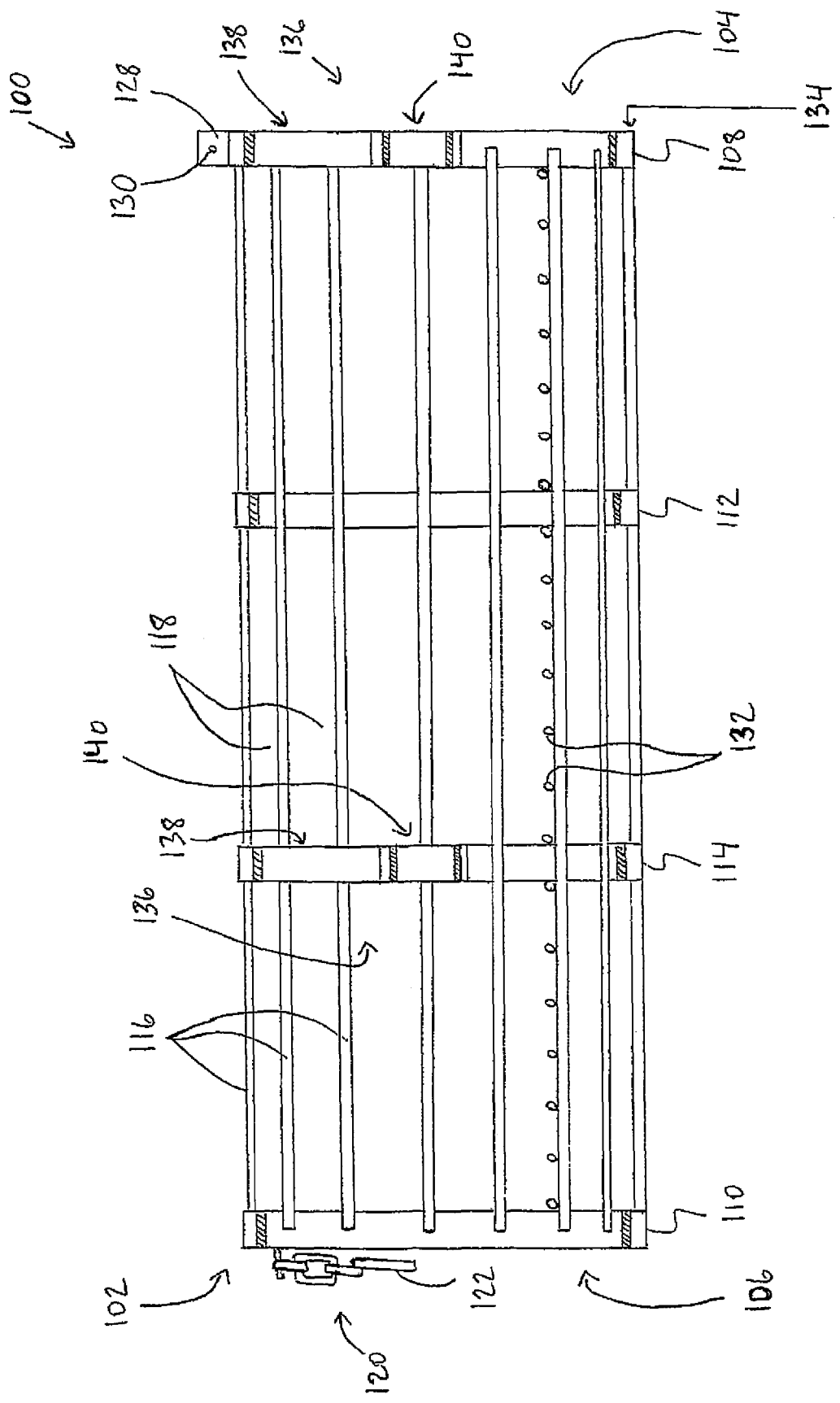
FIG. 1 is right elevation view of a cross-section of the beaver control device.

Referring to the accompanying figures, there is illustrated a beaver control device generally indicated by reference numeral 100. The beaver control device is intended for use with a culvert pipe 1 by coupling to an end thereof, so as to prevent beavers and other similarly-sized animals from entering the culvert pipe.

The beaver control device 100 has a frame 102 as in FIG. 1. The frame, which is tubular, is circular cylindrical in shape and has a first open end 104 at one longitudinal end of the frame, and a second open end 106 at an opposite longitudinal end of the frame. The frame comprises four circular rings which are identical and define a circular cross-section of the frame: a first end ring 108 is at the first open end; a second end ring 110 is at the second open end; and a first intermediate ring 112 and a second intermediate ring 114 are intermediate the first and second open ends. The first intermediate ring is adjacent the first end ring, and the second intermediate ring is between the first intermediate ring and the second end ring. The first and second intermediate rings are positioned along a longitudinal length of the frame so as to divide the frame into three longitudinal sections thereof, each section being approximately equal in longitudinal length. All four circular rings are aligned so that an axis of each one of the circular rings lies along an axis of the frame. An inner diameter of the frame, which is a measure of a width of the frame between opposing portions of an inner surface of the frame measured through the axis of the frame, is arranged to be larger than yet proximate an outer diameter of the culvert pipe. When the frame comprises circular rings, the inner diameter of the frame is measured between opposing portions of the inner surface of the first or second end rings. Consequently, a rim of the second open end 106 receives a rim of the end of the culvert pipe 1 in an active position of the device 100 when the frame 102 is substantially aligned with the culvert pipe end-to-end so that the axis of the frame lies along a longitudinal axis of the culvert pipe as shown in FIG. 4.

Figure 2:
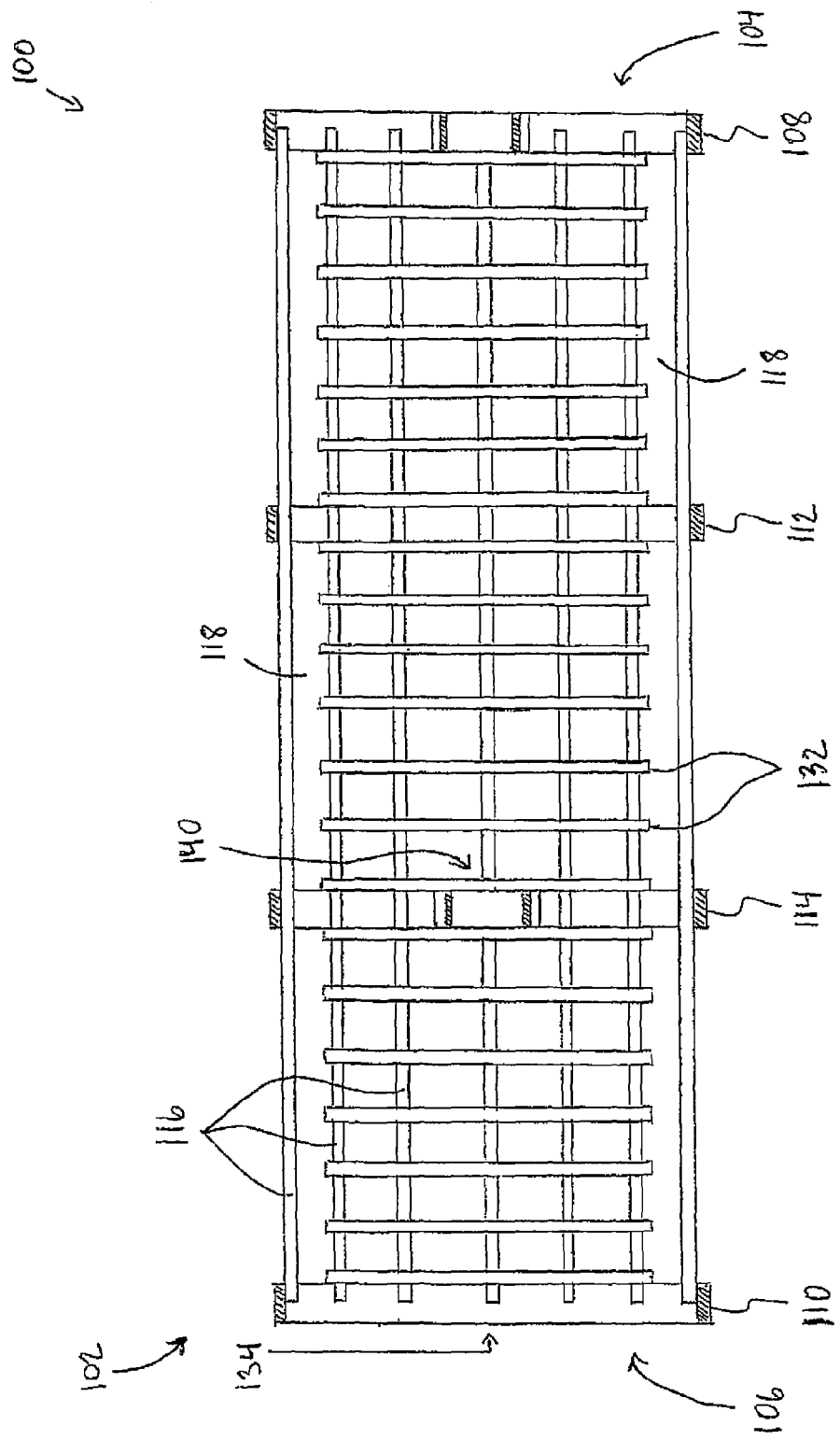
FIG. 2 is a top plan view of another cross section of the beaver control device in FIG. 1.

The frame 102 also comprises longitudinal bars 116 which span between the first 104 and second 106 open ends and are at spaced positions about the frame 102. Each one of the longitudinal bars is circular cylindrical in shape. The longitudinal bars are arranged so that, within each pair of adjacent longitudinal bars, a first longitudinal bar is parallel relative to a second longitudinal bar; furthermore, each one of the longitudinal bars is parallel to the axis of the frame as illustrated in FIGS. 1-2. Each one of the longitudinal bars is coupled to each one of the circular rings at an inner surface thereof; a longitudinal end of each one of the longitudinal bars at the second open end 106 is recessed from an outer edge of the second end ring 110 so as to leave room at the second open end for the rim of the second open end to receive the end of the culvert pipe 1 in the active position. As such, the first 112 and second 114 intermediate rings add structural rigidity by providing additional locations along the longitudinal length of the frame for attaching the longitudinal bars thereto. A structure of the frame comprising circular rings and longitudinal bars as described reduces a mass of the beaver control device compared to using a solid type of construction, such as a solid steel frame. The lower mass is important for making the device 100 easier to transport and for mounting to the end of the culvert pipe 1.

Figure 3:
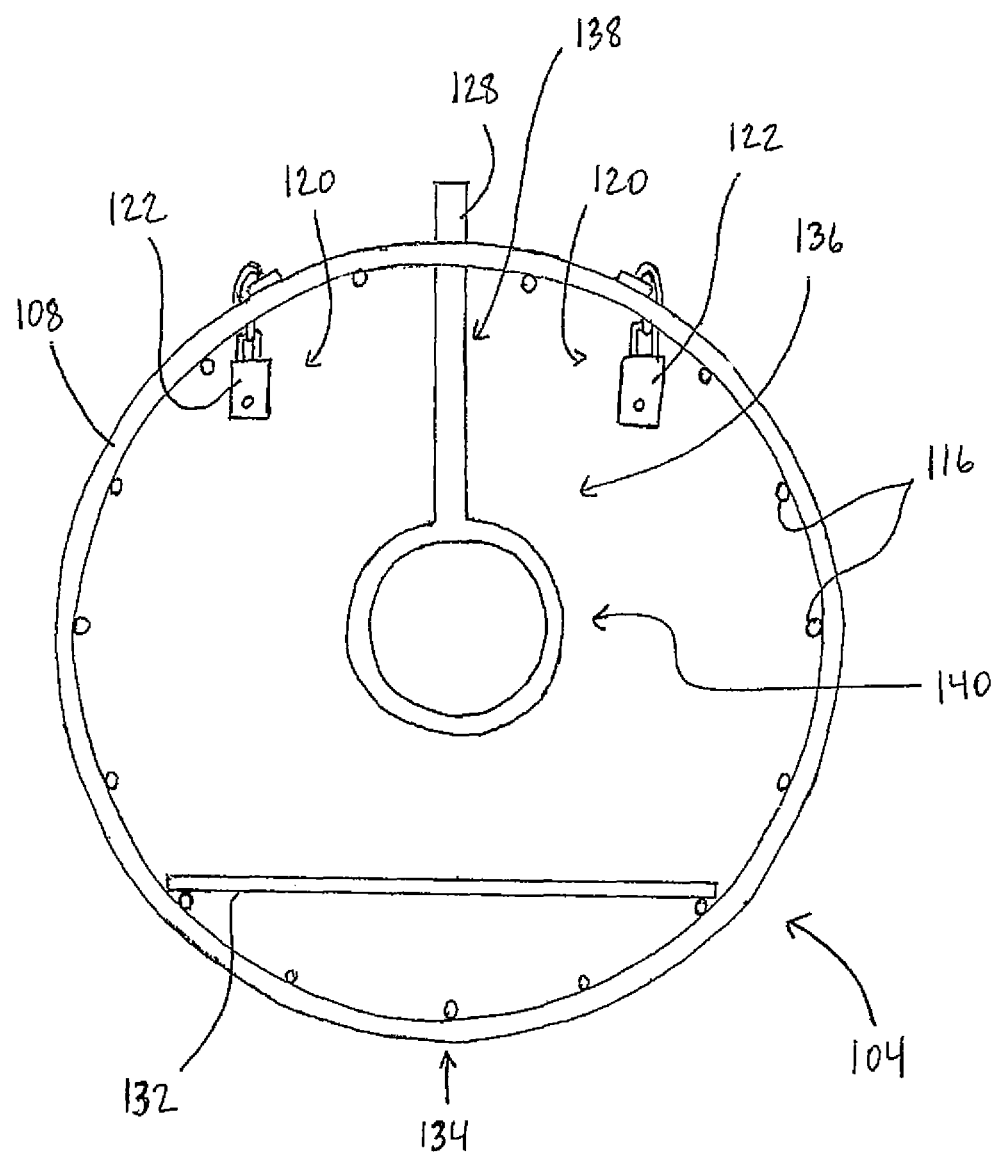
FIG. 3 is an end view of a front of the beaver control device in FIG. 1.
Figure 4:
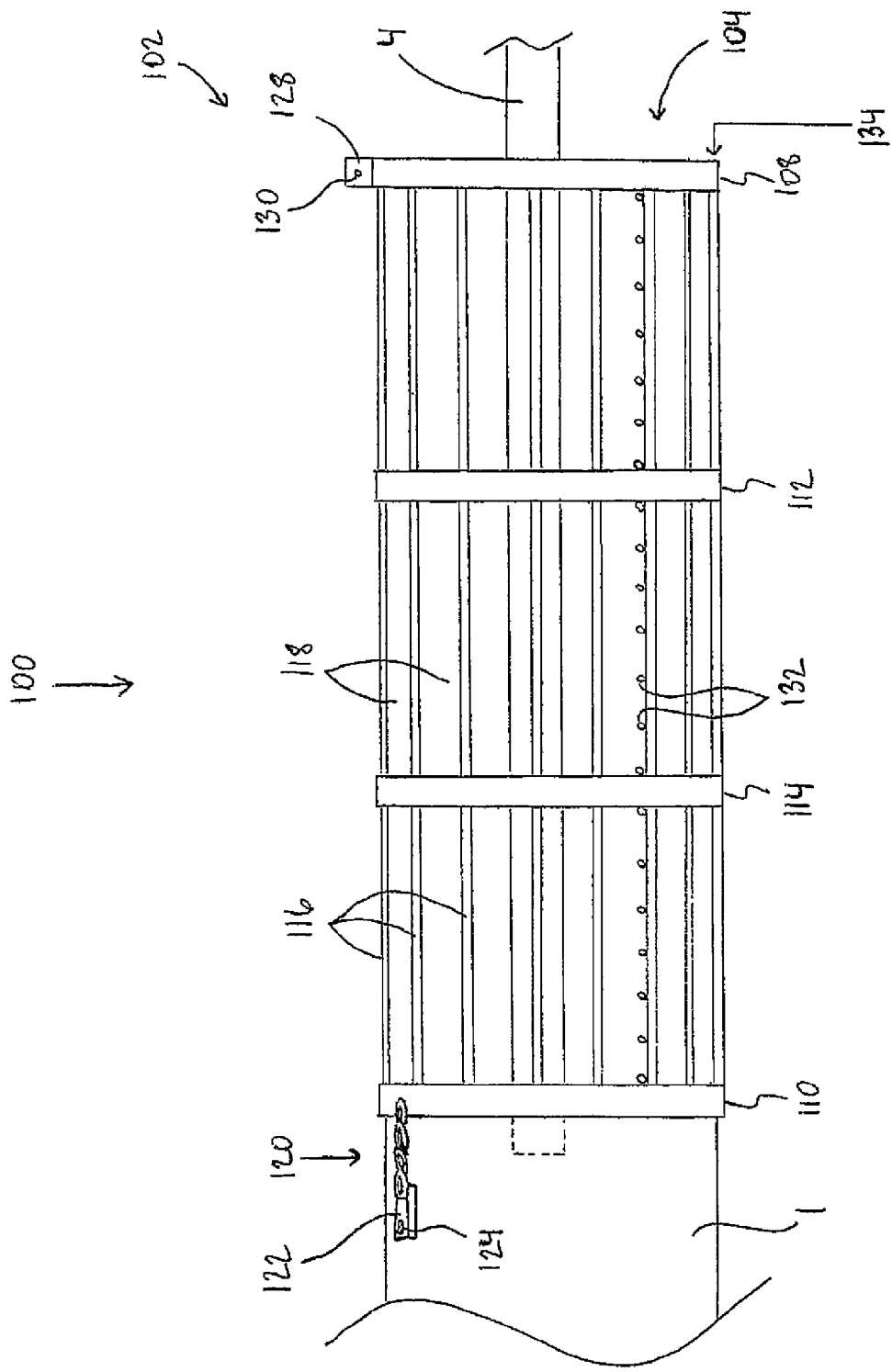
FIG. 4 is a right elevation view of the beaver control device mounted to a culvert pipe and in an active position.

In the preferred embodiment as illustrated in FIGS. 1-5, the longitudinal bars 116 are spaced angularly about the frame so as to form respective gaps 118 between each pair of adjacent longitudinal bars. Each one of the gaps has a width of 4". An opening defined by each one of the gaps has an opening area of 120 square inches. The opening area and elongate shape of each one of the gaps are arranged to prevent beavers and other similarly-sized animals from passing into the beaver control device between any one of the pairs of adjacent longitudinal bars. The gaps 118 may have an opening area which is less than or equal to 150 square inches. The opening area sized within such a range function equally well to obstruct beaver-sized animals when each one of the gaps are elongate as in the preferred embodiment. Accordingly, respective gaps having an opening area equal to the maximum thereof would have a width of 5"; as such, a width of each one of the gaps is less than or equal to 5". Notwithstanding the functional equivalence, narrower gaps between pairs of longitudinal bars 116 necessitate more longitudinal bars about the frame 102, thereby increasing the mass of the device 100. Also, the openings defined by the gaps effect flow of water and small debris into the culvert pipe through alternative openings in the frame other than the first open end 104, which is important in case that debris obstructs the first open end which is a free end of the device when the device is coupled to the culvert pipe 1 in the active position as shown in FIG. 4. As such, these openings spaced angularly about the frame reduce the likelihood of water levels rising due to obstructed ends of the culvert pipe.

Further to the frame 102, the beaver control device 100 also comprises a mounting mechanism arranged for coupling to the culvert pipe 1. The mounting mechanism comprises two lengths 120 of chain. One longitudinal end of each length of chain is attached proximate the second open end 106, to an uppermost portion of the rim of the second open end at laterally opposing points along the rim thereof. An opposing longitudinal end of each length of chain, which is a free end thereof, has a mounting portion arranged for attachment to the end of the culvert pipe. The mounting portion is an elongate plate 122 with holes therein for passing a bolt 124 therethrough to fasten the plate to the culvert pipe 1. The plate is fastened at an uppermost portion of an outer surface of the culvert pipe, at positions along same which are horizontally aligned in both longitudinal and lateral axes with respective locations of attachment of the lengths 120 of chain along the rim of the second open end in addition to being approximately at the same elevation as the respective locations of attachment of the lengths of chain. The lengths of chain are under tension in the active position such that the chains and a bottommost portion of the rim of the second open end 106 provide support for the device 100 against the end of the culvert pipe. In the active position, the beaver control device projects outwards from the end of the culvert pipe so as to resemble an extension thereof. As such, any animals that want to access the culvert pipe 1 have to enter the device at the first open end 104.

Figure 5:
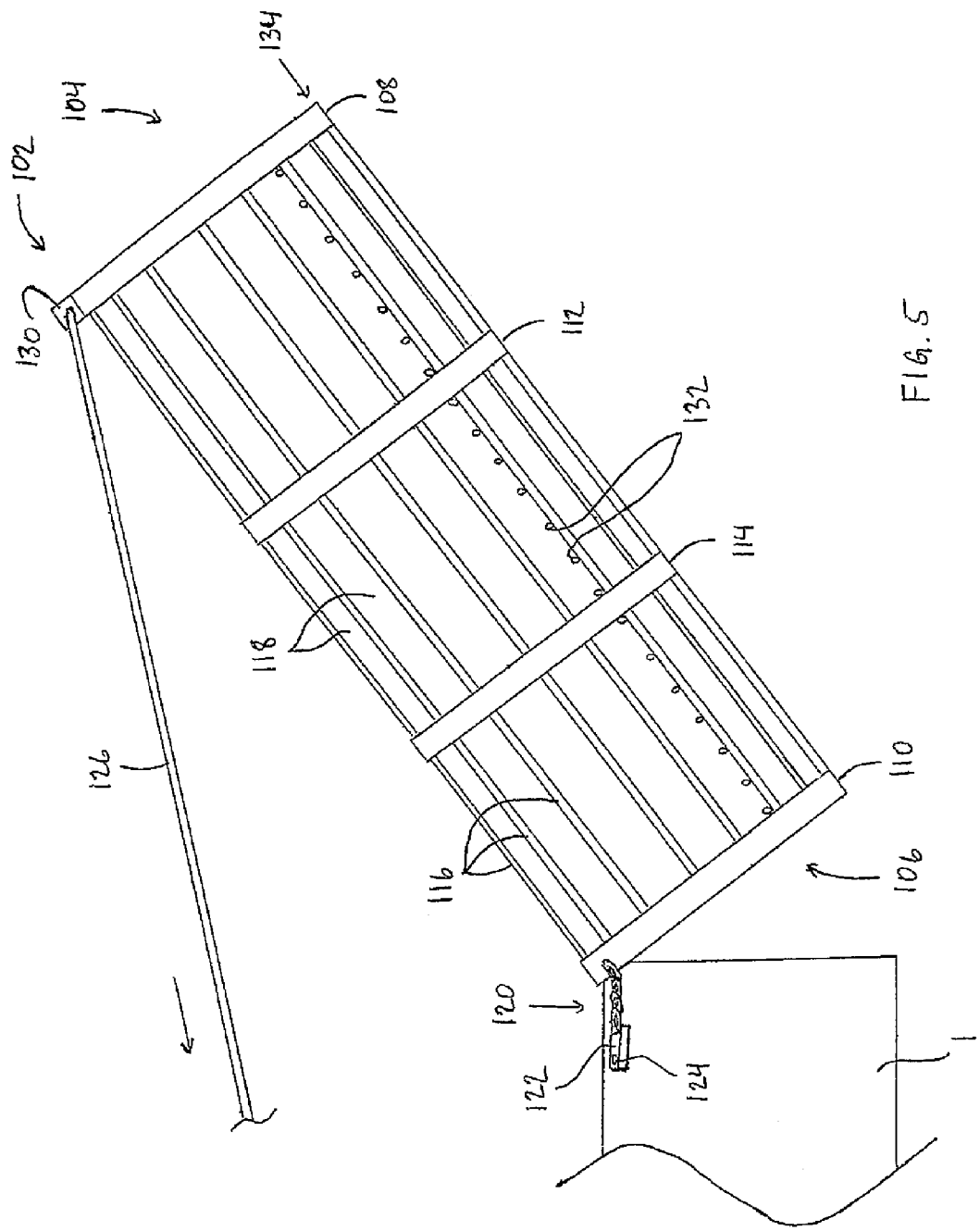
FIG. 5 is a right elevation view of the beaver control device mounted to the culvert pipe and in an inactive position.

The mounting mechanism is arranged to facilitate motion between the active position illustrated in FIG. 4 and an inactive position illustrated in FIG. 5 in which the frame 102 is not substantially aligned with the culvert pipe 1 for purposes of cleaning same. Accordingly, the beaver control device 100 also has a coupler supported on the first open end 104 to facilitate connection of an actuator 126 thereto to effect movement of the frame relative to the end of the culvert pipe between the working and inactive positions. More specifically, the coupler is a coupler plate 128 which projects upward from a topmost portion of the first open end such that opposing surfaces of the coupler plate face in opposing transverse directions of the frame. Furthermore, the coupler plate has an aperture 130 for attaching an actuator 126, such as a rope, thereto to effect pivotal-like movement thereof relative to the end of the culvert pipe between the working and inactive positions. In the inactive position, the device 100 is lifted upright so that the axis of the frame 102 forms an angle with the longitudinal axis of the culvert pipe 1, which affords direct access to the culvert pipe for purposes such as cleaning same.

The beaver control device also includes transverse bars 132. The transverse bars are circular cylindrical in shape and span across transversely opposing portions of the inner surface of the frame 102. More particularly, these transversely opposing portions are horizontally opposing portions of the inner surface of the frame, and when the frame is constructed of the circular rings and longitudinal bars 116 as described earlier, the transverse bars span between one pair of longitudinal bars which are located at horizontally opposing sides of the frame as shown in FIGS. 1-3. Arranging the transverse bars to span a full distance between one pair of longitudinal bars which are at a same horizontal elevation forces a beaver which attempts to pass through the device 100 to traverse the transverse bars, without any way of navigating around same. The transverse bars are elevated relative to a bottommost edge 134 of the frame 102 so as lie in a common horizontal plane. In the preferred embodiment, the bottommost edge of the frame is defined by one of the longitudinal bars 116; the bottommost edge of the frame may rest on the ground depending on a depth of a culvert. Generally speaking, the transverse bars are elevated relative to the bottommost edge so as to be closer to the bottommost edge of the frame than to a topmost edge of the frame which is vertically opposite from the bottommost edge; however, if in an alternative embodiment the bottommost edge if not clearly defined, the transverse bars can be considered to be spaced above at least a portion of a subset of the longitudinal bars 116 that is below a highest respective one of the transversely opposing longitudinal bars to which the transverse bars are attached. In the preferred embodiment, the horizontal plane is elevated relative to the bottommost edge of the frame by a clearance distance of 5" relative to the bottommost edge 134 of the frame. However, the clearance distance may be between 1.5" and 8". A minimum clearance distance of 1.5" is sufficient to present the transverse bars 132 as obstacles which the beaver must overcome and to allow fish, turtles, and small debris to pass underneath the transverse bar, while a maximum clearance distance of 8" ensures that an average-sized beaver cannot pass underneath the transverse bars. An ideal clearance distance of 5" is chosen so as to be larger than while still proximate a length of an average-sized beaver's leg. In general, the clearance distance of the transverse bars 132 creates difficulty and discomfort for the beaver attempting to cross over same, consequently deterring the beaver from passing through the device 100.

Further to the clearance distance, the transverse bars 132 are spaced along the longitudinal length of the frame 102 which is clearly shown in FIG. 2. Each respective transverse bar within each pair of adjacent transverse bars is parallel relative to one another, and each one of the transverse bars lies at a right angle to the axis of the frame. Each pair of adjacent transverse bars has a spacing distance therebetween which is between 1.5" and 7". A minimum spacing distance of 1.5" is sized so that an average-sized beaver's foot can fit in each gap between each pair of adjacent transverse bars, while a maximum spacing distance of 7" ensures that the beaver cannot comfortably insert more than one foot in each gap. In the preferred embodiment, the spacing distance is 4". Regardless of the spacing distance that is chosen, the spacing distance is at least three times larger than a width of each one of the transverse bars so that the beaver cannot walk across or slide its body over the transverse bars. In general, the spacing distance of the transverse bars 132 along the longitudinal length of the frame 102 deters the beaver attempting to cross over the transverse bars by forcing the beaver to insert one foot at a time in each gap between adjacent transverse bars which makes crossing over the transverse bars more difficult and uncomfortable for the beaver.

Lastly, the device 100 also includes hangers 136 for supporting a pipe 4 to drain into the culvert pipe 1 as in FIGS. 1-3. The preferred embodiment comprises two hangers, and each hanger has a coupling portion 138 and a receiving portion 140. The coupling portion 138 is an elongate plate which is attached at a topmost portion of the inner surface of the frame 102 so as to extend downward therefrom. As such, a first of the two hangers is coupled to the first circular ring 108 and a second of the two hangers is coupled to the second intermediate ring 114 as shown in FIGS. 1-2. The receiving portion 140 is arranged to receive the pipe therein. Furthermore, the receiving portion is ring-shaped and oriented so that an axis of the receiving portion is parallel to the axis of the frame. Also, the receiving portion is enclosed so that the receiving portion receives the pipe 4 by passing same through the receiving portion in a direction along an axis which is parallel to the axis of the frame. The bottommost portion of the receiving portion is spaced above the transverse bars 132 to be sufficiently elevated so that the beaver is unable to engage the hanger 136 or the pipe 4 received therein. As illustrated in FIG. 4, the pipe supported by the hangers will have opposing longitudinal ends thereof which ideally extend beyond the first 104 and second 106 open ends of the beaver control device 100. Extension beyond the first open end is important both to effect the flow of water over a beaver dam built in front of the first open end which may be obstructing same and to provide a physical obstacle that deters the beavers from building a taller dam that may engage the pipe.

Prior to use, the beaver control device 100 is manufactured according to the diameter of the culvert pipe 1 with which it will be used in conjunction. Once manufactured, the device is transported to a site where it is to be mounted to the end of the culvert pipe. The device is first aligned with the culvert pipe so that the rim of the second open end 106 receives the rim of the end of the culvert pipe. Once the device is aligned with the culvert pipe, the lengths 120 of chain which are the mounting mechanism are stretched longitudinally away from the frame 102 so as to exert maximum tension therein, and then the elongate plates 122 at the ends of the lengths of chain are fastened with bolts 124 to the uppermost portion of the outer surface of the culvert pipe. Normally, the device is in the active position illustrated in FIG. 4 once the device has been mounted to the end of the culvert pipe. The mounting mechanism has to be able to support any downward torque exerted on the frame 102 as a result of a beaver attempting to pass through the beaver control device or due to the weight of the pipe 4 supported by the hangers 136.

In use, a beaver that attempts to pass through the beaver control device 100 engages the transverse bars 132. If the beaver chooses to overcome a first transverse bar, the beaver must insert one foot at a time in the gap between the first transverse bar and a second transverse bar which is adjacent thereto. The device deters the beaver from continuing further as the clearance and spacing distances of the transverse bars 132 makes passing over same difficult and uncomfortable. As such, the beaver will tend to exit the beaver control device by returning to the first open end 104 and exiting same.

For periodic cleaning of the culvert pipe 1, the actuator 126 attached to the coupler plate 128 is used to raise the device frame 102 into the inactive position as illustrated in FIG. 5. The pipe 4 may be removed from receiving portions 136 of the hangers 136 prior to moving the device into the inactive position so as to prevent the pipe from sliding out of the receiving portions downwards and into the water of a culvert.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A beaver control device for use with a culvert pipe comprising:
a cylindrical frame comprising a plurality of longitudinally extending bars at angularly spaced positions around a longitudinal axis of the cylindrical frame and at least one peripheral bar arrangement interconnecting the longitudinal bars so as to define on the frame a longitudinal length between opposing longitudinal ends thereof, a bottom peripheral portion for resting on the ground, a to peripheral portion which is vertically opposite the bottom peripheral portion, a transverse center plane passing across the frame through the longitudinal axis and an upright center plane passing through the axis joining the bottom peripheral portion and the top peripheral portion;
and a plurality of transverse bars generally parallel to the transverse center plane;
the plurality of transverse bars being arranged at positions spaced along said longitudinal length of the frame;
each of the transverse bars spanning substantially straight across the frame from a position at or adjacent the frame on a first side of the upright center plane to a position at or adjacent the frame on second opposite side of the upright center plane;
wherein the plurality of transverse bars are elevated above the bottom peripheral portion of the frame and located at a position below the transverse center plane so that the transverse bars are closer to the bottom peripheral portion than to the top peripheral portion.

2. The beaver control device according to claim 1, wherein each one of the transverse bars is elevated relative to the bottom peripheral portion by a clearance distance which is between 1.5" and 8".

3. The beaver control device according to claim 1, wherein each pair of adjacent transverse bars has a spacing distance therebetween which is at least three times greater than a width of each one of the transverse bars.

4. The beaver control device according to claim 1, wherein the transverse bars are spaced along the longitudinal length so that each pair of adjacent transverse bars has a spacing distance therebetween which is between 1.5" and 7".

5. The beaver control device according to claim 1, wherein each one of the transverse bars is coupled at each longitudinal end thereof to respective ones of the longitudinally extending bars.

6. The beaver control device according to claim 1, wherein the transverse bars are aligned so as to lie in a common plane parallel to the transverse center plane.

7. The beaver control device according to claim 1, wherein said at least one peripheral bar arrangement comprises a plurality of rings at spaced positions along the longitudinally extending bars.

8. The beaver control device according to claim 1, further comprising a plurality of hangers attached to the frame and extending toward the axis for supporting a pipe.

9. The beaver control device according to claim 1, wherein the longitudinal ends of the frame are open to allow passage into the frame of beaver.

10. The beaver control device according to claim 1, wherein the transverse bars extend at right angles to the upright center plane.

11. A beaver control device for use with a culvert pipe comprising:
a cylindrical frame comprising a plurality of longitudinally extending bars at angularly spaced positions around a longitudinal axis of the cylindrical frame and at least one peripheral bar arrangement interconnecting the longitudinal bars so as to define on the frame a longitudinal length between opposing longitudinal ends thereof, a bottom peripheral portion for resting on the ground, a top peripheral portion which is vertically opposite the bottom peripheral portion, a transverse center plane passing across the frame through the longitudinal axis and an upright center plane passing through the axis joining the bottom peripheral portion and the top peripheral portion;
and a plurality of transverse bars generally parallel to the transverse center plane;
the plurality of transverse bars being arranged at positions spaced along said longitudinal length of the frame;
each of the transverse bars being connected at a first end to a respective first one of the longitudinally extending bars and being connected at a second end to a respective second one of the longitudinally extending bars and spanning substantially straight across the frame from one side of said upright center plane to an opposed side of said upright center plane;

wherein the plurality of transverse bars are elevated above the bottom peripheral portion of the frame and located at a position below the transverse center plane so that the transverse bars are closer to the bottom peripheral portion than to the top peripheral portion.

12. The beaver control device according to claim 11, wherein each one of the transverse bars is elevated relative to the bottom peripheral portion by a clearance distance which is between 1.5" and 8".

13. The beaver control device according to claim 11, wherein each pair of adjacent transverse bars has a spacing distance therebetween which is at least three times greater than a width of each one of the transverse bars.

14. The beaver control device according to claim 11, wherein the transverse bars are spaced along the longitudinal length so that each pair of adjacent transverse bars has a spacing distance therebetween which is between 1.5" and 7".

15. The beaver control device according to claim 11, wherein the transverse bars are aligned so as to lie in a common plane parallel to the transverse center plane.

16. The beaver control device according to claim 11, wherein said at least one peripheral bar arrangement comprises a plurality of rings at spaced positions along the longitudinally extending bars.

17. The beaver control device according to claim 11, further comprising a plurality of hangers attached to the frame and extending toward the axis for supporting a pipe.

18. The beaver control device according to claim 11, wherein the transverse bars extend at right angles to the upright center plane.

* * * * *